United States Patent
Lin

(10) Patent No.: US 6,719,310 B1
(45) Date of Patent: Apr. 13, 2004

(54) SELF-MOVABLE VEHICLE

(76) Inventor: Teng Hsiang Lin, No. 12, Lane 127, Dungshi 2$^{nd}$ Rd., Daan Shiang, Taichung Hsien (TW)

( * ) Notice: Subject to any disclaimer, the term of this patent is extended or adjusted under 35 U.S.C. 154(b) by 0 days.

(21) Appl. No.: 10/273,340

(22) Filed: Oct. 17, 2002

(51) Int. Cl.$^7$ ................................................ B62M 1/00
(52) U.S. Cl. .............................. 280/87.041; 280/87.01; 280/62
(58) Field of Search ...................... 280/87.01, 87.021, 280/87.041, 87.042, 87.03, 62, 200, 220, 221, 252, 263, 291, 282, 639, 1.191, 1.181, 218, 210

(56) References Cited

U.S. PATENT DOCUMENTS

| | | | | |
|---|---|---|---|---|
| 4,050,712 A | * | 9/1977 | Denzer et al. | 280/278 |
| 4,540,192 A | * | 9/1985 | Shelton | 280/282 |
| 6,467,781 B1 | * | 10/2002 | Feng | 280/87.01 |
| 6,485,039 B1 | * | 11/2002 | Ming-Fu | 280/87.041 |
| 6,517,093 B2 | * | 2/2003 | Feng | 280/87.042 |
| 6,554,302 B1 | * | 4/2003 | Liu | 280/87.041 |

* cited by examiner

Primary Examiner—Brian L. Johnson
Assistant Examiner—Brian Swenson
(74) Attorney, Agent, or Firm—Alan Kamrath

(57) ABSTRACT

A self-movable vehicle includes a head board, a head tube, a steering tube having a front wheel, two rear frames, two tread boards, and two rear wheel sets. The self-movable vehicle also includes two meshing arcuate toothed plates each secured on a respective one of the two rear frames to pivot therewith, and a tensile spring mounted between the two rear frames. Thus, the two rear frames are pivoted and moved outward and inward synchronously With an equal deflection angle by the design of the two meshing arcuate toothed plates, thereby enhancing the balance effect and stability of the self-movable vehicle.

5 Claims, 7 Drawing Sheets

SELF-MOVABLE VEHICLE

BACKGROUND OF THE INVENTION

1. Field of the Invention

The present invention relates to a self-movable vehicle, and more particularly to a self-movable vehicle, wherein the two rear frames are pivoted and moved outward and inward synchronously with an equal deflection angle by the design of the two meshing arcuate toothed plates, thereby enhancing the balance effect and stability of the self-movable vehicle.

2. Description of the Related Art

A conventional self-movable vehicle in accordance with the prior art shown in FIG. 7 comprises a head board 30, a handlebar 35 pivotally mounted on a front end of the head board 30, two rear frames 31 each having a front end pivotally mounted on a rear end of the head board 30 and a second end provided with a wheel seat 32 which has a bottom provided with a rear wheel set 33, and two tread boards 34 each mounted on a respective one of the two rear frames 31.

In operation, the user's two feet are stepped on the two tread boards 34, so that the two rear frames 31 are initially pivoted and moved outward relative to each other, and are then pivoted and moved toward each other, so that the two rear wheel sets 33 are deflected, thereby driving the self-movable vehicle to move forward.

However, each of the two tread boards 34 is fixed on a respective one of the two rear frames 31, so that when the two rear frames 31 are pivoted and moved outward, the two tread boards 34 are also moved outward, thereby producing an angular displacement, so that the user's ankles are easily twisted and distorted, thereby injuring the user's ankles. In addition, the user has to apply a larger stepping force to move the self-movable vehicle, thereby consuming energy and manual work.

SUMMARY OF THE INVENTION

The present invention has arisen to mitigate and/or obviate the disadvantage of the conventional self-movable vehicle.

The primary objective of the present invention is to provide a self-movable vehicle, wherein the two rear frames are pivoted and moved outward and inward synchronously with an equal deflection angle by the design of the two meshing arcuate toothed plates, thereby enhancing the balance effect and stability of the self-movable vehicle.

Another objective of the present invention is to provide a self-movable vehicle, wherein the tensile spring mounted between the two rear frames may help the two rear frames to approach each other easily and conveniently, thereby facilitating the user pivoting and moving the two rear frames to move the self-movable vehicle, and thereby saving the manual work.

A further objective of the present invention is to provide a self-movable vehicle, wherein the bent portion of the pivot plate is slidably mounted in the arcuate slot of each of the two rear frames, thereby limiting further rotation of each of the two tread boards and each of the two rear wheel sets.

In accordance with the present invention, there is provided a self-movable vehicle, comprising a head board, a head tube secured on a front end of the head board, a steering tube pivotally mounted on the head tube and having a lower end provided with a front wheel, two rear frames each having a front end pivotally mounted on a rear end of the head board, two tread boards each pivotally mounted on a top face of a rear end of a respective one of the two rear frames, and two rear wheel sets each pivotally mounted on a bottom face of the rear end of a respective one of the two rear frames, wherein:

the self-movable vehicle further comprises two arcuate toothed plates meshing with each other and each secured on the front end of a respective one of the two rear frames to pivot therewith, and a tensile spring mounted between the two rear frames; and each of the two rear frames has a bottom face formed with an arcuate slot, each of the two tread boards has a bottom face protruded with a shaft extended through each of the two rear frames, a pivot plate is secured on the shaft of each of the two tread boards, the pivot plate has a first side formed with a bent portion slidably mounted in the arcuate slot of each of the two rear frames and a second side secured with two linking members each having a free end formed with a bent end which is secured on each of the two rear wheel sets.

Further benefits and advantages of the present invention will become apparent after a careful reading of the detailed description with appropriate reference to the accompanying drawings.

DETAILED DESCRIPTION OF THE INVENTION

Figure 1:
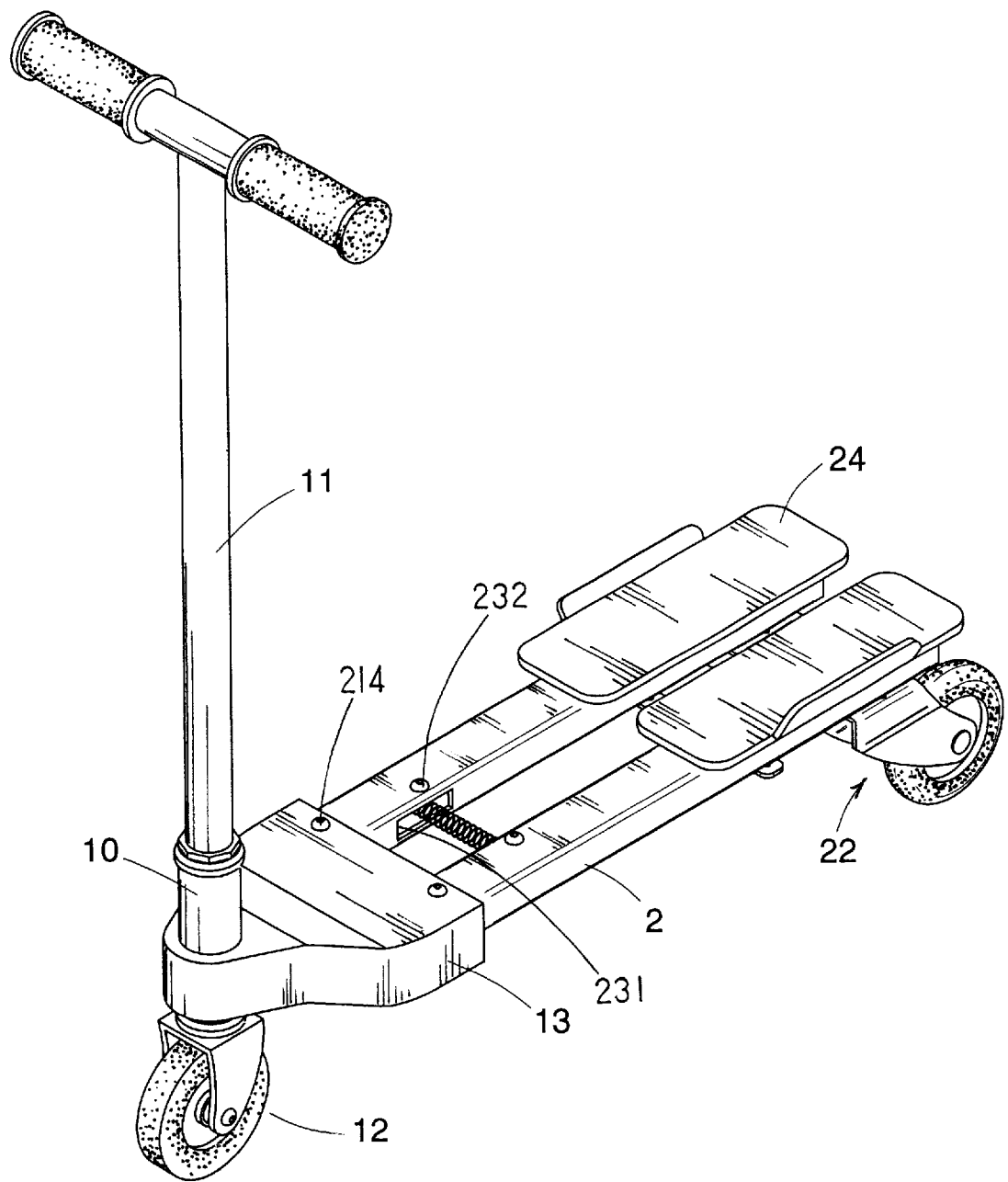
FIG. 1 is a perspective view of a self-movable vehicle in accordance with a preferred embodiment of the present invention.

Referring to the drawings and initially to FIGS. 1–4, a self-movable vehicle in accordance with a preferred embodiment of the present invention comprises a head tube 10, a head board 13, two rear frames 2, two tread boards 24, and two rear wheel sets 22.

The head tube 10 is secured on a front end of the head board 13. A steering tube 11 is pivotally mounted on the head tube 10, and has a lower end provided with a front wheel 12. The head board 13 is hollow, and has an opened rear end.

Each of the two rear frames 2 has a front end pivotally mounted on the opened rear end of the head board 13 by a pivot pin 214, so that each of the two rear frames 2 is pivoted relative to the head board 13 about the pivot pin 214. The self-movable vehicle further comprises two arcuate toothed plates 212 meshing with each other and each secured on the front end of a respective one of the two rear frames 2 to pivot therewith. Each of the two arcuate toothed plates 212 is pivoted about the pivot pin 214.

Each of the two rear frames 2 has a mediate portion formed with a receiving recess 231. The self-movable vehicle further comprises a tensile spring 23 urged between the two rear frames 2 and having two ends each secured in the receiving recess 231 of a respective one of the two rear frames 2 by a set screw 232.

Each of the two rear frames 2 has a rear end formed with a first through hole 201 to allow pivoting of each of the two tread boards 24 and a second through hole 202 to allow pivoting of each of the two rear wheel sets 22. Each of the two rear frames 2 has a bottom face formed with an arcuate slot 203 co-axial with the first through hole 201. The first through hole 201 of each of the two rear frames 2 has a top face and a bottom face each respectively provided with an opposite bushing 26 which has an lug 261 respectively rested on a top face and a bottom face of each of the two rear frames 2.

Each of the two tread boards 24 is pivotally mounted on the rear end of a respective one of the two rear frames 2. Each of the two tread boards 24 has a bottom face protruded with a shaft 241 inserted into the bushing 26 on the top face of the first through hole 201 of each of the two rear frames 2, and a plurality of annular arranged rolling balls 27 are mounted between the shaft 241 of each of the two tread boards 24 and the bushing 26 on the top face of the first through hole 201 of each of the two rear frames 2. In addition, the bushing 26 on the bottom face of the first through hole 201 of each of the two rear frames 2 is provided with a pivot plate 28 which is screwed with a fixing screw 29 which is screwed into the shaft 241 of each of the two tread boards 24, thereby securing the pivot plate 28 on the shaft 241 of each of the two tread boards 24.

The pivot plate 28 has a first side formed with a bent portion 281 slidably mounted in the arcuate slot 203 of each of the two rear frames 2 and a second side secured with two linking members 282 each having a free end formed with a downward bent end 283 which is secured on each of the two rear wheel sets 22. In addition, each of the two rear wheel sets 22 is pivotally mounted on the rear end of a respective one of the two rear frames 2.

In addition, each of the two rear frames 2 is provided with a bump 213, thereby preventing the two rear frames 2 or the two tread boards 24 from hitting or colliding each other.

Figure 2:
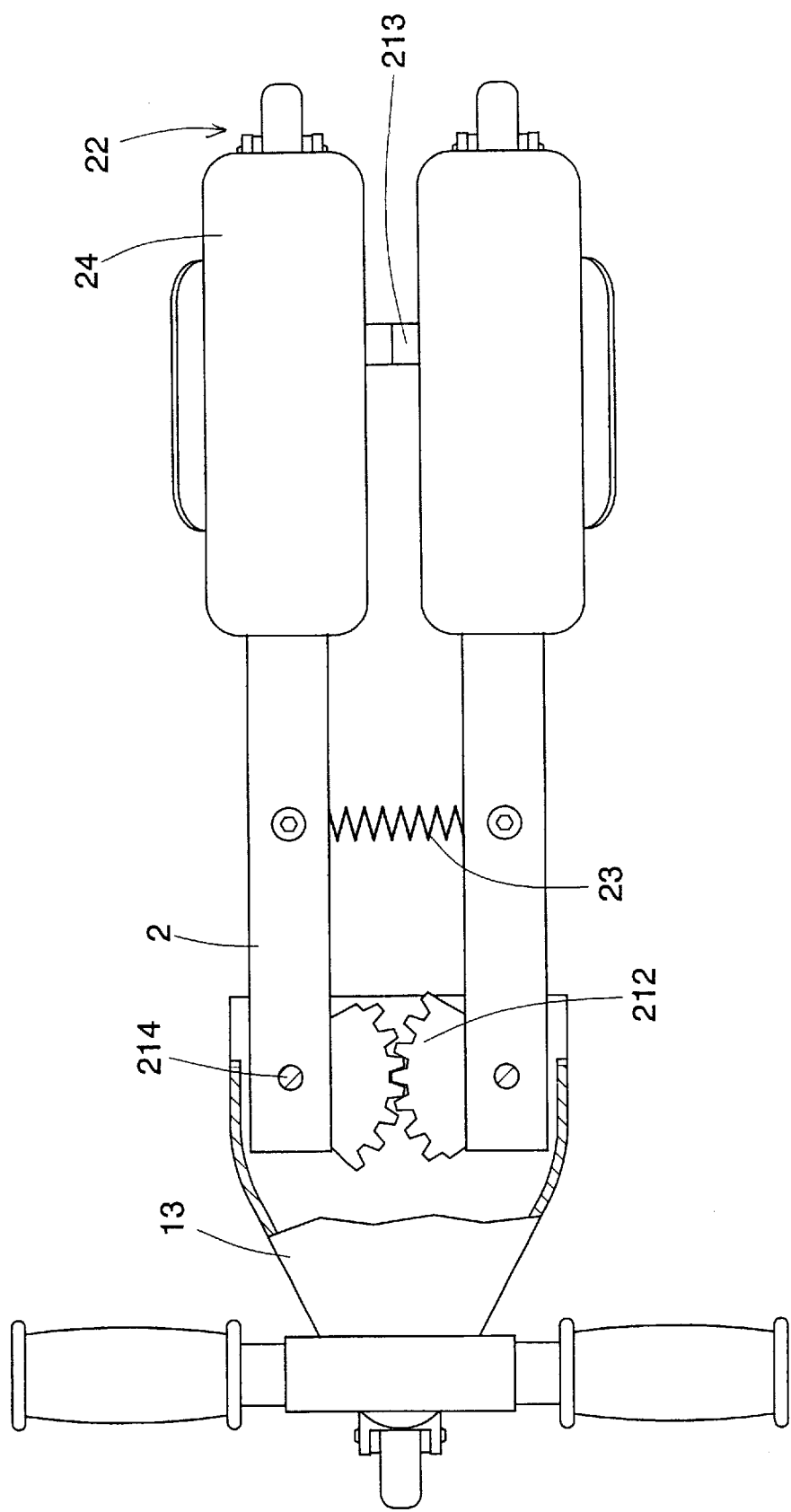
FIG. 2 is a top plan partially cross-sectional view of the self-movable vehicle as shown in FIG. 1.
Figure 3:
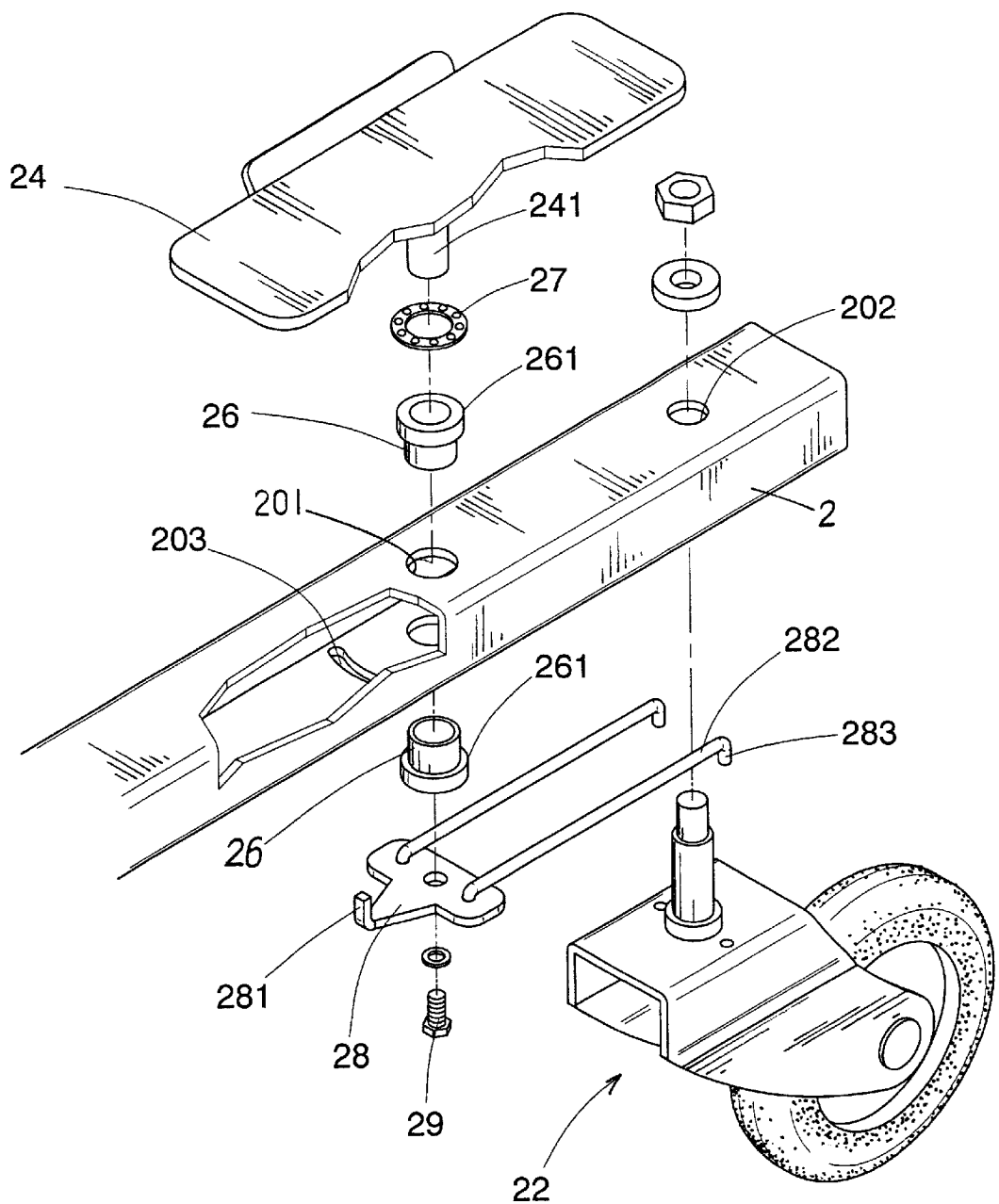
FIG. 3 is a partially exploded perspective view of the self-movable vehicle as shown in FIG. 1.
Figure 4:
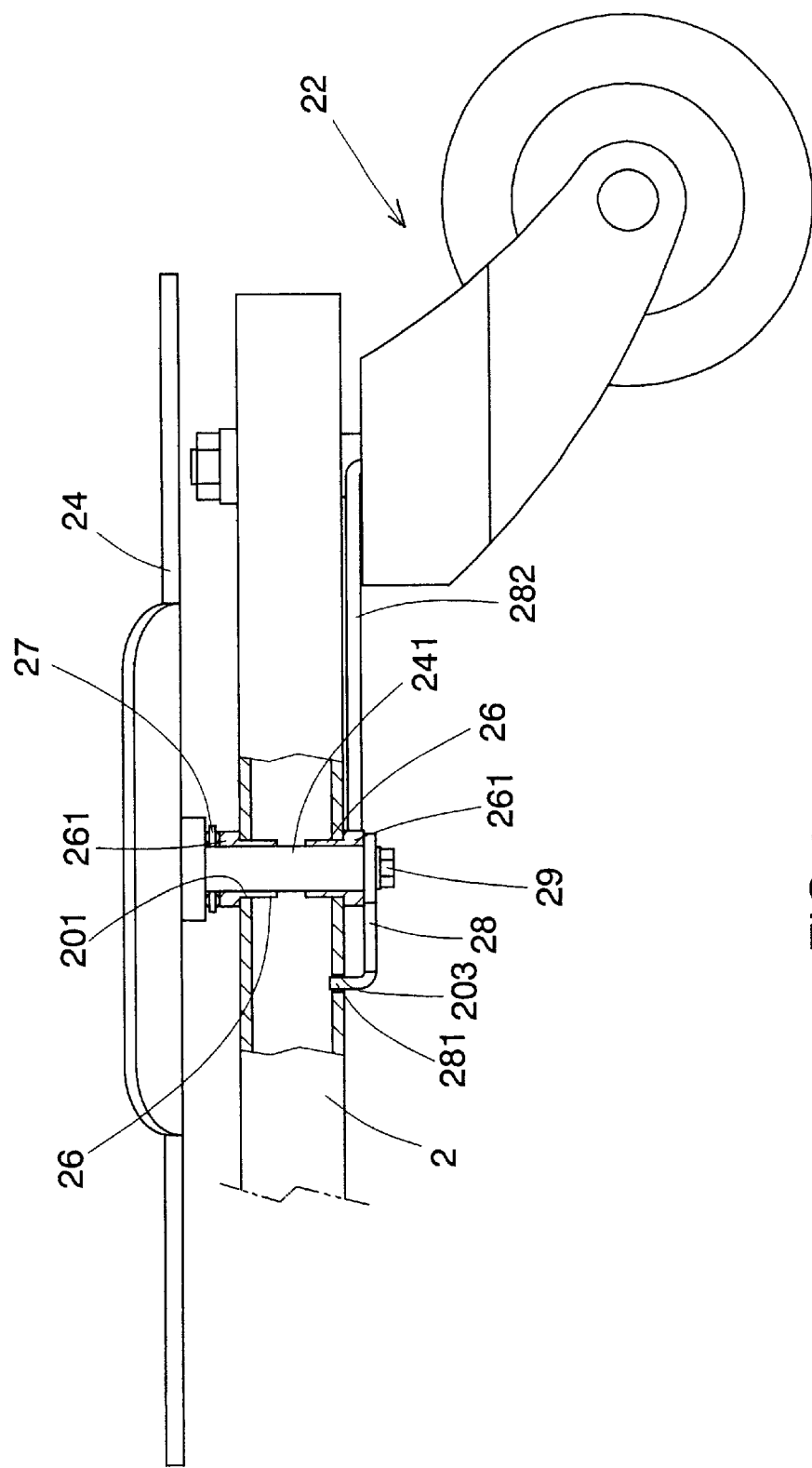
FIG. 4 is a side plan partially cross-sectional view of the self-movable vehicle as shown in FIG. 1.
Figure 5:
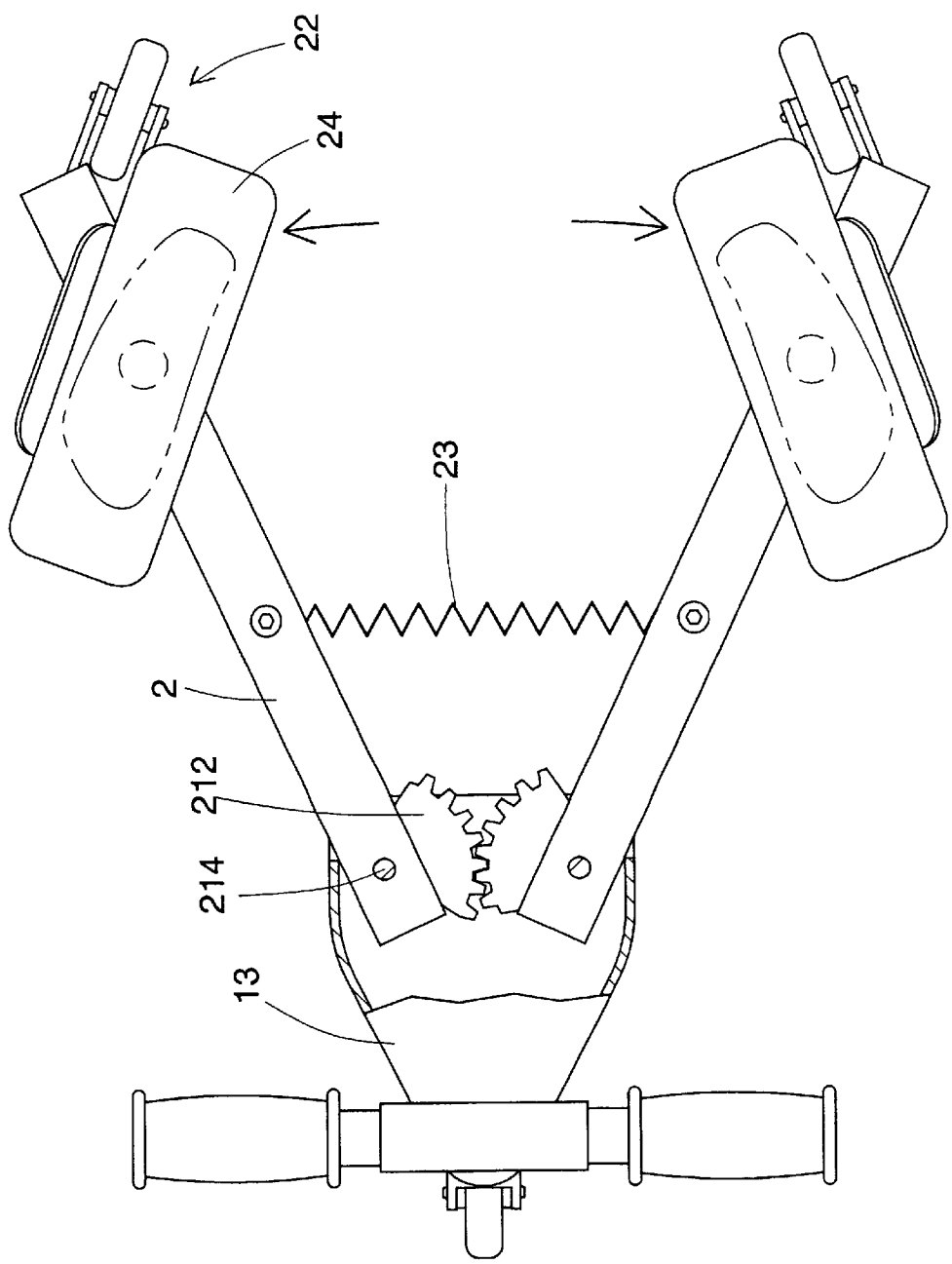
FIG. 5 is a schematic operational view of the self-movable vehicle as shown in FIG. 2 in use.

In operation, referring to FIGS. 1–5, the user's two feet are stepped on the two tread boards 24, so that the two rear frames 2 are initially pivoted and moved outward relative to each other as shown in FIG. 5, and are then pivoted and moved inward to approach each other as shown in FIG. 2, so that the two rear wheel sets 22 are deflected. The above-mentioned operation is continued and repeated, so as to produce a power, thereby driving the self-movable vehicle to move forward.

When the two rear frames 2 are pivoted and moved relative to each other as shown in FIGS. 2 and 5, the two arcuate toothed plates 212 mesh with each other, so that the two rear frames 2 are pivoted and moved relative to each other synchronously. Thus, each of the two rear frames 2 has an equal deflection angle, so that the two rear frames 2 are pivoted and moved rigidly and stably.

In addition, when the two rear frames 2 are pivoted and moved outward relative to each other as shown in FIG. 5, the tensile spring 23 mounted between the two rear frames 2 applies a pulling force on the two rear frames 2, so that the two rear frames 2 may approach each other easily, thereby facilitating the user pivoting and moving the two rear frames 2 to move the self-movable vehicle, and thereby saving the manual work.

Figure 6:
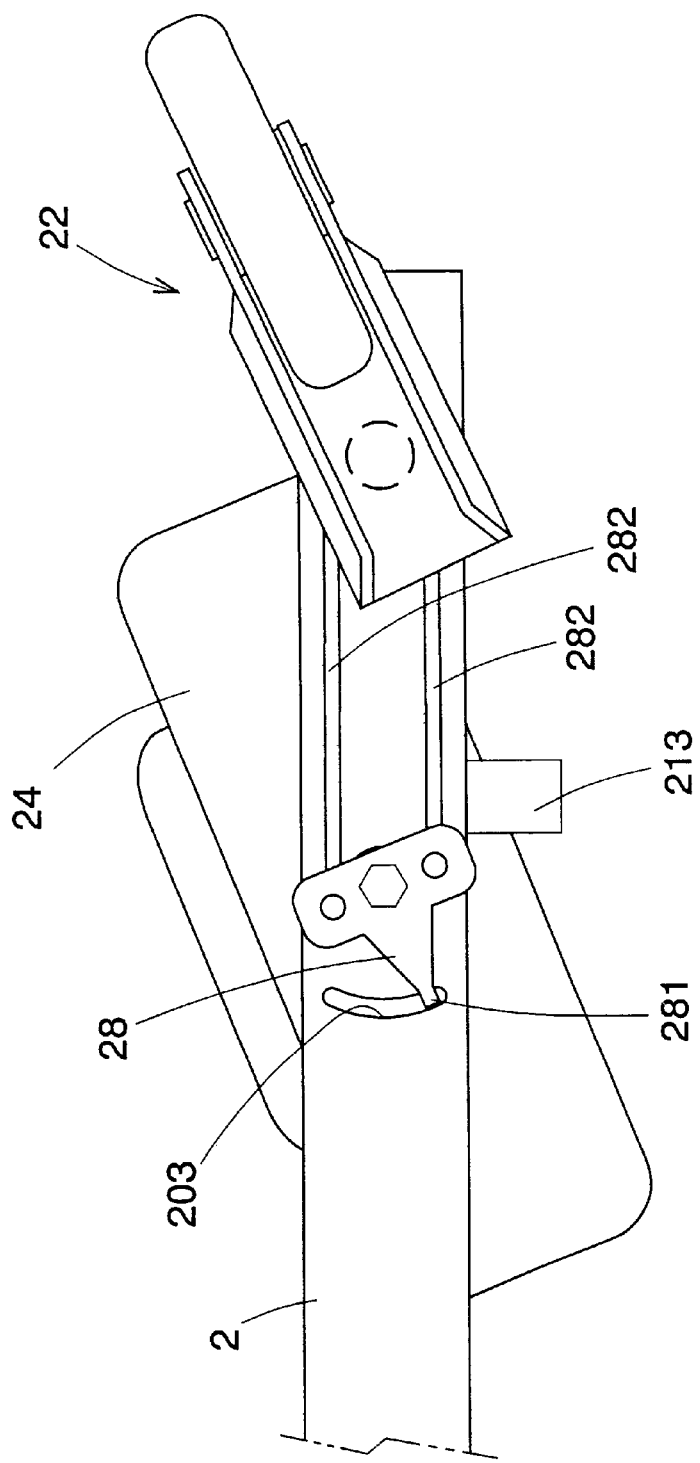
FIG. 6 is a partially bottom plan view of the self-movable vehicle as shown in FIG. 5.
Figure 7:
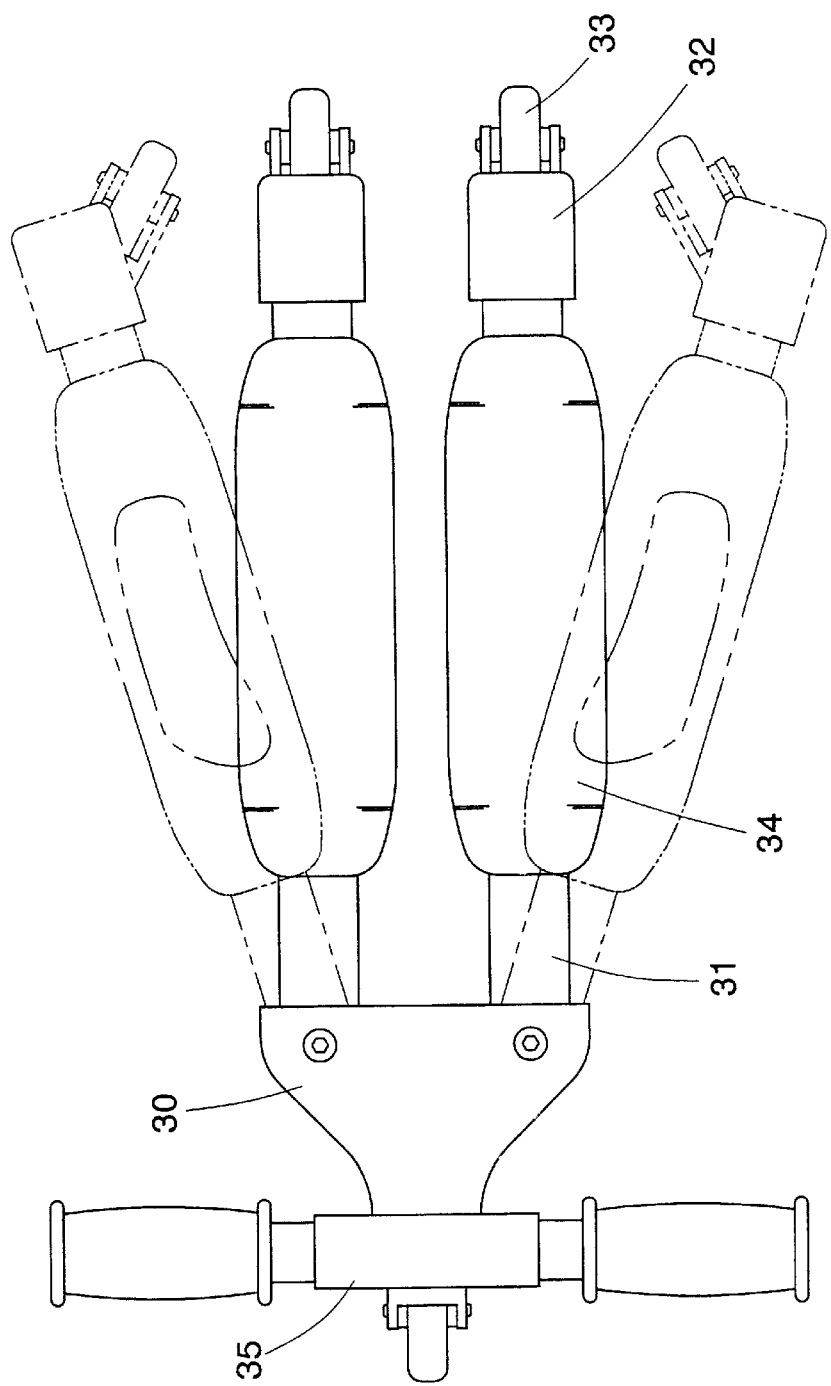
FIG. 7 is a top plan operational view of a conventional self-movable vehicle in accordance with the prior art.

As shown in FIG. 6, when the two rear frames 2 are pivoted and moved relative to each other as shown in FIGS. 2 and 5, the two rear wheel sets 22 are pivoted and deflected, thereby driving the self-movable vehicle to move forward. Each of the two tread boards 24 is pivotally mounted on the rear end of a respective one of the two rear frames 2. Thus, when the two rear frames 2 are pivoted and moved outward relative to each other as shown in FIG. 5, each of the two tread boards 24 is pivoted relative to the respective rear frame 2 as shown in FIG. 6, so that each of the two tread boards 24 is directed toward the moving direction of the self-movable vehicle as shown in FIG. 5, to prevent the user's ankles from being twisted and distorted, thereby preventing the user's ankles from being hurt.

In addition, the bent portion 281 of the pivot plate 28 is slidably mounted in the arcuate slot 203 of each of the two rear frames 2, thereby limiting further rotation of each of the two tread boards 24 and each of the two rear wheel sets 22.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A self-movable vehicle, comprising a head board, a head tube secured on a front end of the head board, a steering tube pivotally mounted on the head tube and having a lower end provided with a front wheel, two rear frames each having a front end pivotally mounted on a rear end of the head board, two tread boards each pivotally mounted on a top face of a rear end of a respective one of the two rear frames, and two rear wheel sets each pivotally mounted on a bottom face of the rear end of a respective one of the two rear frames, wherein:

the self-movable vehicle further comprises two arcuate toothed plates meshing with each other and each secured on the front end of a respective one of the two rear frames to pivot therewith, and a tensile spring mounted between the two rear frames; and each of the two rear frames has a bottom face formed with an arcuate slot, each of the two tread boards has a bottom face protruded with a shaft extended through each of the two rear frames, a pivot plate is secured on the shaft of each of the two tread boards, the pivot plate has a first side formed with a bent portion slidably mounted in the arcuate slot of each of the two rear frames and a second side secured with two linking members each having a free end formed with a bent end which is secured on each of the two rear wheel sets.

2. The self-movable vehicle in accordance with claim 1, wherein each of the two rear frames has a mediate portion formed with a receiving recess, and the tensile spring has two ends each secured in the receiving recess of a respective one of the two rear frames.

3. The self-movable vehicle in accordance with claim 1, wherein each of the two rear frames is provided with a bump.

4. The self-movable vehicle in accordance with claim 1, further comprising a plurality of annular arranged rolling balls mounted on the shaft of each of the two tread boards.

5. The self-movable vehicle in accordance with claim 1, further comprising a bushing mounted between the shaft of each of the two tread boards and each of the two rear frames.

* * * * *